(12) United States Patent
Dubief et al.

(10) Patent No.: US 11,907,802 B2
(45) Date of Patent: Feb. 20, 2024

(54) SYSTEM OF CODED PACKAGE AND APPARATUS

(71) Applicant: SOCIETE DES PRODUITS NESTLE S.A., Vevey (CH)

(72) Inventors: Flavien Dubief, Champagne (CH); Stefano Ceccaroli, Chavornay (CH); Riste Pindjurov, Neyruz (CH); Sandrine Jaccard, Ste-Croix (CH)

(73) Assignee: Societe des Produits Nestle S.A., Vevey (CH)

( * ) Notice: Subject to any disclaimer, the term of this patent is extended or adjusted under 35 U.S.C. 154(b) by 178 days.

(21) Appl. No.: 17/425,874

(22) PCT Filed: Jan. 20, 2020

(86) PCT No.: PCT/EP2020/051303
§ 371 (c)(1),
(2) Date: Jul. 26, 2021

(87) PCT Pub. No.: WO2020/156861
PCT Pub. Date: Aug. 6, 2020

(65) Prior Publication Data
US 2022/0180082 A1    Jun. 9, 2022

(30) Foreign Application Priority Data
Jan. 28, 2019   (EP) ..................................... 19153911

(51) Int. Cl.
*G06K 7/14*      (2006.01)
*G06K 7/10*      (2006.01)
*G06K 19/06*     (2006.01)

(52) U.S. Cl.
CPC ....... *G06K 7/1417* (2013.01); *G06K 7/10732* (2013.01); *G06K 7/1443* (2013.01); *G06K 19/06037* (2013.01)

(58) Field of Classification Search
CPC ............. G06K 7/1417; G06K 7/10732; G06K 7/1443; G06K 19/06037
See application file for complete search history.

(56) References Cited

U.S. PATENT DOCUMENTS

2002/0100286 A1    8/2002 Maeda
2006/0289508 A1*  12/2006 Kim ..................... H05B 6/6441
                                                      219/702
(Continued)

FOREIGN PATENT DOCUMENTS

CN     103635913 A    3/2014
CN     104380310 A    2/2015
(Continued)

OTHER PUBLICATIONS

Chinese Office Action for Appl No. 202080010805.8 dated Nov. 24, 2023.

*Primary Examiner* — Laura A Gudorf
(74) *Attorney, Agent, or Firm* — K&L Gates LLP (57) ABSTRACT

The invention concerns a system (10) of a package (2) containing a product and an apparatus (1) using said product, the apparatus being refilled by the product contained in the package, wherein a code (21) related to the contained product is associated to the package, said code being a two dimension code and said code presenting a predetermined surface $S_{code}$, and wherein the apparatus comprises a code reader (11) to read the code associated to the package, said code reader being an image capturing device, said image capturing device being defined by: —a predetermined focal range, —a horizontal angle of view α and a vertical angle of view β, wherein the apparatus comprises a housing structure (16) and a cavity (12) inside the housing structure, wherein the image capturing device is positioned at the back side of the cavity.

11 Claims, 4 Drawing Sheets

(56) References Cited

U.S. PATENT DOCUMENTS

| | | | |
|---|---|---|---|
| 2007/0116816 A1* | 5/2007 | Kim | H05B 6/6441 |
| | | | 426/523 |
| 2008/0089986 A1 | 4/2008 | Song | |
| 2009/0130277 A1* | 5/2009 | Bressner | A23N 12/08 |
| | | | 99/468 |
| 2009/0230194 A1 | 9/2009 | Calderon | |
| 2009/0250519 A1* | 10/2009 | Yamada | G06K 7/10732 |
| | | | 235/454 |

FOREIGN PATENT DOCUMENTS

| | | |
|---|---|---|
| JP | 2010152928 A | 7/2010 |
| JP | 2011164934 A | 8/2011 |

* cited by examiner

SYSTEM OF CODED PACKAGE AND APPARATUS

CROSS REFERENCE TO RELATED APPLICATIONS

The present application is a National Stage of International Application No. PCT/EP2020/051303, filed on Jan. 20, 2020. which claims priority to European Patent Application No. 19153911.3, filed on Jan. 28, 2019, the entire contents of which are being incorporated herein by reference.

FIELD OF THE INVENTION

The present invention relates to systems comprising a package containing a product and an apparatus using said product, the apparatus being refilled by the product contained in the package.

BACKGROUND OF THE INVENTION

In the field of food, apparatuses processing a starting material to produce a final consumable product are current. For example, in the field of beverages, roasting apparatuses are filled with green beans in order to produce coffee roasted beans and brewing apparatuses are filled with roast and ground coffee in order to produce a coffee beverage.

With the aim of providing a consistent quality of the final product and of making the use of these apparatuses more convenient for operators, it has become current to supply package of green beans or roast and ground beans with coded information about the product and its process recipe and to provide the apparatus with a code reader to automatically supply such information and automatically process the product.

Such common codes are barcodes or QR codes, usually printed on the packages of products, and the corresponding code readers are optical readers like cameras. During the operation of reading the code provided with the package of product, the package is usually hold in front of the code reader so that the image of the code is captured and this image is processed by the control unit of the apparatus.

It has been noticed that often the capture of the image of the code is not straight forward and that the operator is forced to present the code several times with different orientations in front of the code reader until the image is captured. This is not convenient, particularly when the apparatus is a professional apparatus frequently used by the operator all along the day.

In addition, during this operation of presenting the code in front of the code reader, the operator intuitively slides the part of the package holding the code along the surface of the code reader, usually a transparent window, that becomes scratched in some areas with the result that reading can become even more difficult and irritating with time.

US 2002/0100286 discloses a freezer with barcode readers positioned at edges of the opening door, that are on the opposite side of the rotary shaft for opening/closing the door. Bar codes for food can be read by the reader during the operations of putting-in and putting-out foods by passing the bar code along the edge of the door, This prior art does not describe the code reader itself and the problem of reading the bar code rapidly and efficiently.

An object of the invention is to address at least some of the drawbacks of the prior art systems using code readers or at least to provide an alternative thereto.

SUMMARY OF THE INVENTION

In a first aspect of the invention, there is provided a system of a package containing a product and an apparatus using said product, the apparatus being refilled by the product contained in the package, wherein a code related to the contained product is associated to the package, said code being a two dimension code and said code presenting a predetermined surface $S_{code}$, and wherein the apparatus comprises a code reader to read the code associated to the package, said code reader being an image capturing device, said image capturing device being defined by:

a predetermined focal range, a horizontal angle of view $\alpha$ and a vertical angle of view $\beta$, wherein the apparatus comprises a housing structure and a cavity inside the housing structure, said cavity extending from a back side at the inside of the housing structure to a front side at the external surface of the housing and comprising at least one lateral wall extending between the back side and the front side of the cavity, wherein the image capturing device is positioned at the back side of the cavity and the optical axis of the image capturing device extends in direction of the middle of the front side of the cavity, wherein the front side of the cavity consists in a hole in the external surface of the housing structure, said hole presenting a surface $S_{cavity}$ such that:

$$1.2\ S_{code} \leq S_{cavity} \leq 6\ S_{code}$$

wherein the distance extending between the back side of the cavity and the front side of the cavity is comprised in the focal range of the image capturing device, and wherein the at least one lateral wall of the cavity is configured to surround the horizontal angle of view $\alpha$ and the vertical angle of view $\beta$ of the image capturing device.

The operation of presenting the code to the code reader consists in holding the code in front of the code reader. Usually, the code is a barcode or a QR code. Preferably it is a QR code.

Generally the image capturing device is a camera.

The housing structure of the apparatus comprises a cavity. This cavity is defined by a back side at the inside of the housing structure, a front side at the external surface of the housing and at least one lateral wall extending between the back side and the front side of the cavity.

The image capturing device is positioned at the back side of the cavity and the optical axis of the image capturing device extends in direction of the middle of the front side of the cavity. The at least one lateral wall of the cavity is configured to surround the horizontal angle of view $\alpha$ and the vertical angle of view $\beta$ of the image capturing device. As a result, the viewing zone of the image capturing device is surrounded by the at least one lateral wall of the cavity inside the housing structure.

This cavity advantageously protects the capturing image device from dust and dirtiness present inside the housing of the apparatus. Yet, in order to avoid interaction of the lateral wall of the cavity with the image of the code to be captured, the at least one lateral wall of the cavity is configured to surround the horizontal angle of view $\alpha$ and the vertical angle of view $\beta$ of the image capturing device. By "surround", it is meant that the wall is around and positioned at a distance from the angles of view. Accordingly, the at least one lateral wall does not impinge on the angles of view. Generally, the at least one lateral wall of the cavity is configured to surround the horizontal angle of view α and the vertical angle of view β of the image capturing device by a distance that is greater than 0, usually of at least 1 mm.

The at least one lateral wall can present any shape as long as the wall surrounds the angles of view. In one embodiment, the cavity can comprise four lateral plane walls defining a global lateral wall with a rectangle cross section area. Alternatively, the lateral wall can present the shape of a cone diverging from the back side to the front side of the cavity.

The front side of the cavity is a hole in the external surface of the housing structure. Preferably, this hole is empty. By empty, its meant that this hole does not comprise or is not covered by any material, even transparent, like a glass. Due to the absence of glass, there is no risk that this surface becomes damaged, e.g. scratched. When the operator positions the code in front of this hole in order to read it, the view through this hole remains always transparent.

In the preferred embodiment, where the hole in the external surface of the housing structure is empty, the cavity can comprise a protecting transparent wall at the back side of the cavity. This wall protects the image capturing device if someone introduces his/her fingers inside the cavity.

The surface $S_{cavity}$ of the hole of the front side of the cavity such that:

$$1.2\ S_{code} \leq S_{cavity} \leq 6\ S_{code}$$

Accordingly, the surface of the hole is at least slightly greater than the surface of the code which guarantees that the whole surface $S_{code}$ of the code is able to face the hole and is able to be captured by the capturing image device.

Yet, the surface of the hole shall not be too important compared to the code. The advantage is that this forces the operator to position the code near the optical axis of the image capturing device rather than too far from this optical axis.

Finally, the cavity is configured so that the distance extending between the back side of the cavity and the front side of the cavity is comprised in the focal range of the image capturing device.

As a result, when the operator slides the code along the external surface of the housing and in front of the cavity hole at the external surface of the housing structure, the code is immediately in the focal range of the image capturing device and there is no need for the operator to re-position the code until he/she finds the right distance.

Preferably, the shape of the outline of the code and the shape of the outline of the hole of the front side of the cavity are similar.

Due to this similarity, it becomes more intuitive for the operator to position the code correctly and to get immediate capture of the image of the code by the code reader.

According to the preferred embodiment, the code is a QR code with a square or rectangle outline and the shape of the outline of the hole of the front side of the cavity presents an outline of similar square or rectangle shape.

Preferably, the apparatus comprises a light source, said light source being oriented to illuminate the hole from the inside of the cavity. The light source is usually positioned at the back side of the cavity. In one embodiment, the light source can be integrated inside the image capturing device.

Consequently, the light source enables a better capture of the code.

The light source can be a light emitting diode, a bulb light or any other source.

Generally the code provides information related to the contained product, said information being comprised in the list of: identification of the product, quantity of product, nature of the product, origin of the product, shelf-life of the product and/or parameters related to the way to process the product inside the machine.

The identification of the product can correspond to an SKU reference.

The nature of the product can relate to the level of roasting of the coffee (green or partially pre-roasted) in case or coffee beans coffee, or to the milk, coffee, tea or cocoa nature in case of soluble beverage powders.

The origin of the product can relate to the place of production like arabica or robusta coffee or to the producing farmers in case of coffee beans.

The process parameters can provide roasting profile in case of a coffee roaster or brewing parameters om case of a brewing apparatus or mixing parameters in case of a soluble beverage dispenser Generally, the apparatus comprises a control system operable to process the product, said control system being configured to:
  analyse the captured image of the code,
  obtain information related to the product based on the captured image,
  process the product based on the obtained information.

Preferably, the apparatus is a coffee beans roasting apparatus and the package comprises green or partially pre-roasted coffee beans.

Generally the coffee beans roasting apparatus comprises:
  a vessel to contain coffee beans,
  a heater to heat coffee beans in the vessel,
  and the control system of the apparatus is operable to control the heater based on information provided by the code.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
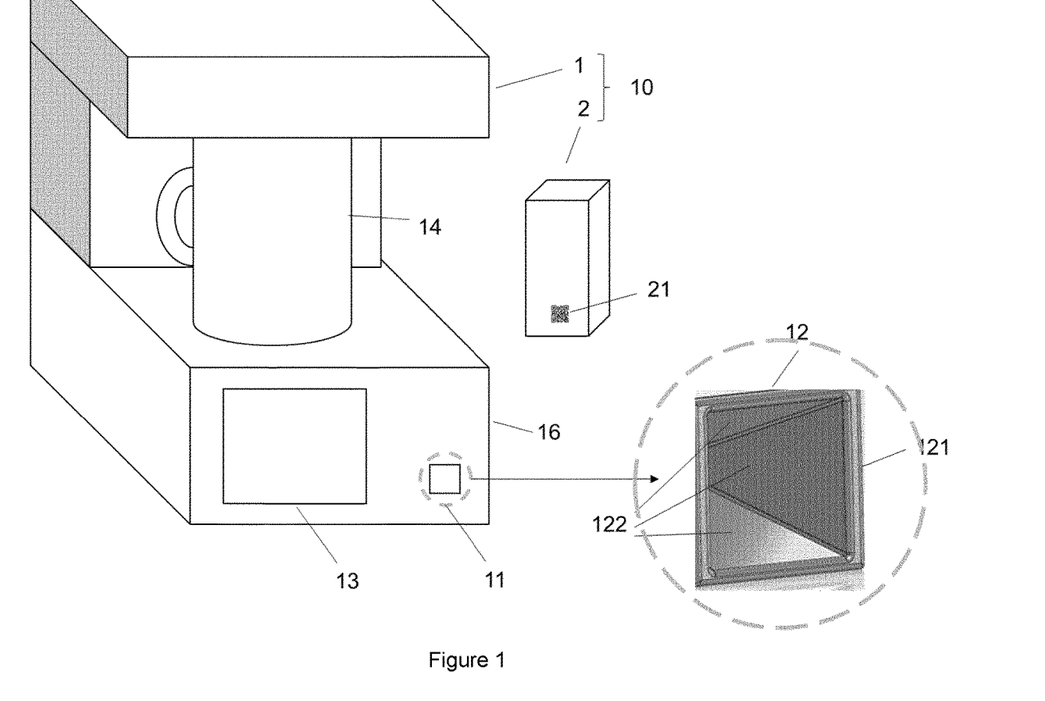
FIG. 1 is a schematic view of a system according to the invention.

FIG. 1 illustrates schematically a system according to the invention comprising an apparatus 1 and a package 2 containing a product.

The apparatus 1 is configured to use the product of the package, generally to process this product further to the introduction of the product inside the apparatus. In the illustrated embodiment, the apparatus comprises a vessel 14 configured to receive the product contained in the packaging and to process it. For example, the apparatus can be a coffee beans roasting apparatus and the vessel 14 can be a roasting chamber. This roasting vessel can be removable from the roasting apparatus so that coffee beans contained in the package 2 can be filled inside. Once attached to the roasting apparatus, the roasting vessel can be heated with hot air to roast the coffee beans.

Alternatively, the vessel 14 can be a beverage preparation chamber configured to receive a beverage ingredient like roast and ground coffee, leaf tea, instant soluble coffee or any other soluble beverage ingredient and to contact this ingredient with a diluent, usually water. The vessel can be removable to enable the operator to introduce product from the packaging, alternatively, the apparatus can comprise an intermediate storing container that can be filled with the product of the package 2 before the product processed by the apparatus.

The package can contain one dose of product to be used once by the apparatus (like a single serving packet of food ingredient) or may contain a larger quantity of product for several uses by the apparatus (like a multiple servings pouch or a flexible bag of food or beverage ingredient).

A code 21 is associated to the package 2 of product. Preferably this code 21 is a two dimension code like a code bar or a QR code as illustrated.

The code can be of any shape (round, square or whatever) Whatever the shape, this two dimension code presents a predetermined surface $S_{code}$. Preferably the code is a QR code with a square or rectangle shape.

Preferably the code is printed on the external surface of the package. Alternatively, the code can be provided on a support different from the package but associated to the package like packaging overwrapping the package or a user notice supplied with the package. It can also be supplied from the display of a mobile device like a smartphone or a smart tablet.

The apparatus 1 comprises a code reader 11 to read the code associated to the package. This code reader assembly is positioned in the apparatus so that the operator is able to easily position the code 21 in front of it. It is preferably positioned at the front face of the apparatus, for example close to a user interface or display 13 of the apparatus. Accordingly, information provided by the code can be immediately displayed through the display 13 positioned aside.

Figure 2:
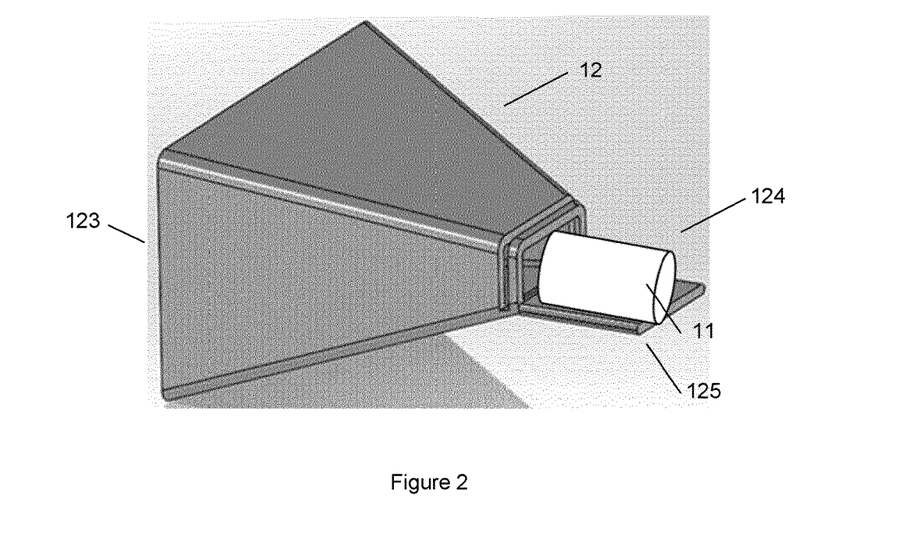
FIG. 2 is a back side view of the cavity of the code reader.
Figure 3:
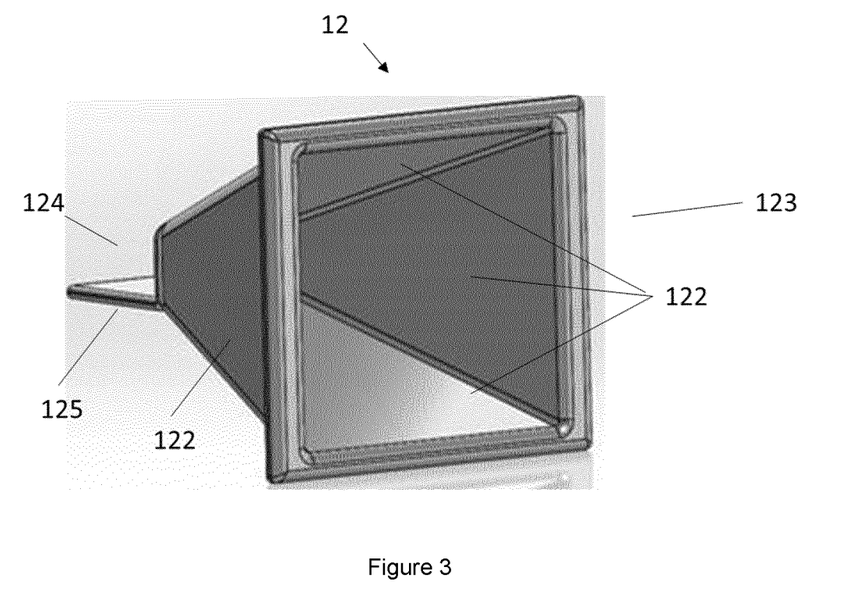
FIG. 3 is a front side view of the cavity of the code reader.

FIG. 1 provides a magnified front side view of the code reader 11. The code reader is positioned at the back side of an empty cavity 12 of the housing structure 16 of the apparatus. This cavity inside the housing structure extends from a hole 121 at the external surface of the housing structure to the inside of the housing structure. In the illustrated embodiment, this cavity comprises four lateral walls 122 extending between the front side 123 of the cavity to the back side of the cavity. Three of these walls appear in FIG. 1, the last one is illustrated in FIG. 3 showing the cavity 12 isolated from the housing. Usually the cross section of the cavity defines a shape like a square, a rectangle, an ellipse or a circle. FIG. 2 provides a back side view of this cavity 12 showing the back side 124 of the cavity.

The code reader 11 is positioned at this back side 124 of the cavity

The code reader is an image capturing device like a camera.

The code reader is preferably positioned so that its lens is positioned at the back side of the cavity and its view angles open from the back side of the cavity. The code reader 11 is positioned so that its optical axis extends in direction of the middle of the front side of the cavity (as illustrated in below FIGS. 5A, 5B).

In order to be correctly positioned, the image capturing device 11 can be attached on a supporting plate 125 extending horizontally from the back side 124 of the cavity.

In the preferred embodiment the hole 121 is empty and the user can slide the code along the hole without risk of scratching the surface of a glass material positioned through the hole. Usually, in this preferred embodiment, a transparent wall is positioned at the back side of the cavity and in front of the image capturing device 11 in order to protect the lens of the image capturing device 11. This transparent wall can be gently cleaned by an operator putting his/her fingers inside the cavity 12 without touching the image capturing device. The risk this transparent wall is low compared to a transparent wall that would be positioned through the hole 121.

The hole 121 of the cavity at the front side presents a surface $S_{hole}$ that depends on the size of the surface of the code 21. In particular:

$$1.2\ S_{code} \leq S_{hole} \leq 6\ S_{code}$$

Respecting these ratios guarantees that the whole surface of the code is able to be positioned in front of the hole 121 and that the code 21 can be relatively easily positioned near the middle of the hole that is close to the optical axis of the code reader.

Figure 4:
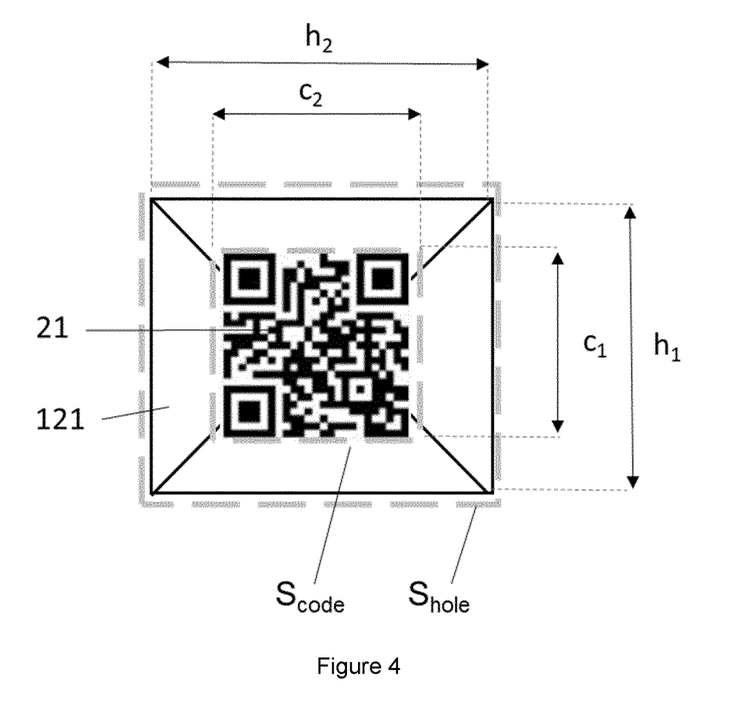
FIG. 4 illustrates the relative sizes of the surfaces of the code and the hole of the cavity.

FIG. 4 illustrates in dotted lines the size of the surface $S_{code}$ of the code and the size of the surface $S_{hole}$ of the hole of the cavity.

FIG. 4 illustrates one preferred embodiment where the code 21 is a QR code with a square or rectangle outline. In that embodiment, the hole 121 of the front side of the cavity presents preferably an outline of similar shape. With a code 21 presenting a predetermined shape, that is a square or rectangle outline having one side of length $c_1$ and the other side of length $c_2$, the shape of the outline of the hole 121 can be defined as a square or rectangle having one side of length $h_1$ and the other side of length $h_2$, with:

$$h_1 = f_1 \times c_1, \text{ and}$$

$$h_2 = f_2 \times c_2$$

where $f_1$ and $f_2$ are factors either identical or different and comprised between 1.2 and 2.5.

Figure 5A:
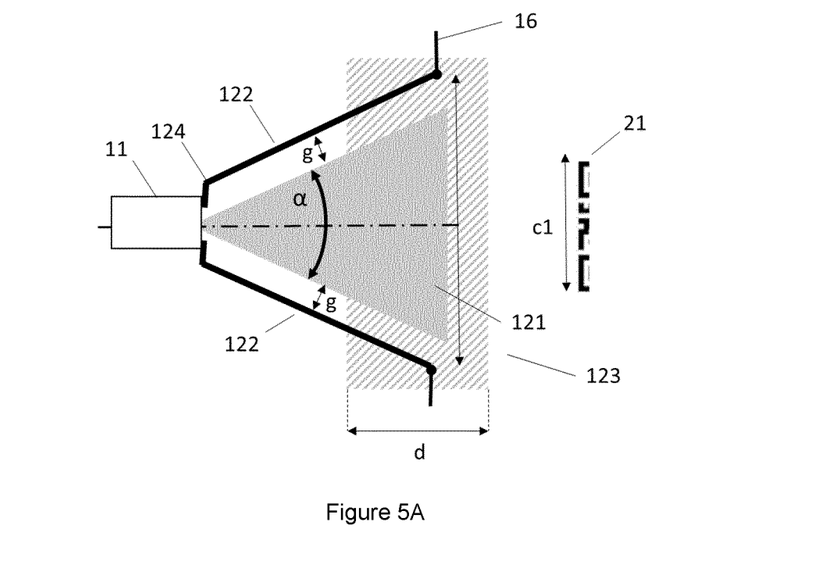
FIG. 5A is a schematic horizontal cross-sectional view of the code reader and the code as taken along the optical axis.

FIG. 5A illustrates schematically the horizontal cross-sectional view of the image capturing device 11, the cavity 12 and the code 21 as taken along the optical axis image capturing device when the operator positions the code 21 in front of the hole 121.

Figure 5B:
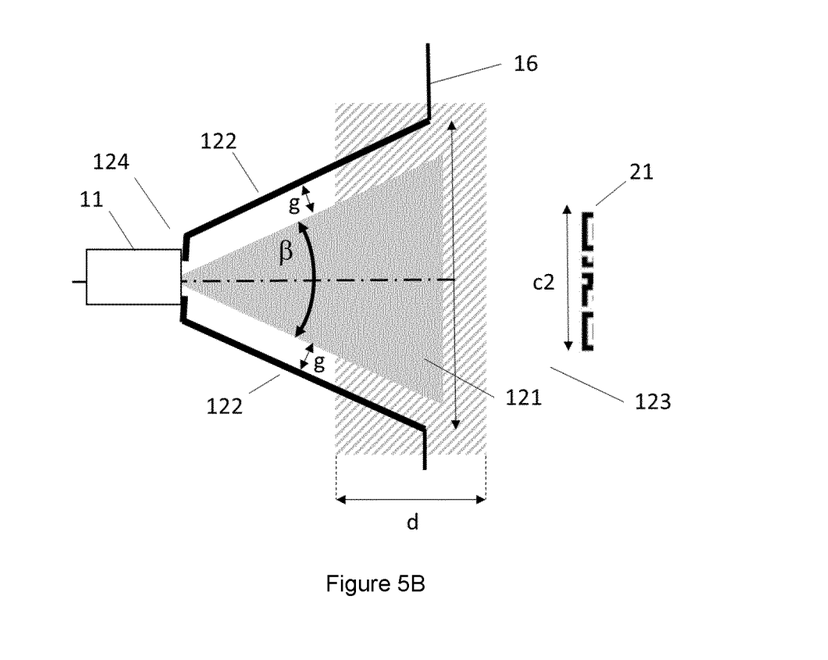
FIG. 5B is a schematic vertical cross-sectional view of the code reader and the code as taken along the optical axis, FIG. 6 a schematic horizontal cross-sectional view of a code reader comprising a light source.

FIG. 5B provides the same illustration along the vertical cross-sectional view.

The distance extending between the back side 124 of the cavity and the front side 123 of the cavity is comprised in the focal range of the image capturing device 11. This focal range d of the image capturing device 11 is illustrated by a hachured zone in FIGS. 5A and 5B, which guarantees that the image capturing device 11 is able to capture a precise image of the code 21 when the operator positions the code in front of and close to the hole 121.

In addition, as illustrated in FIGS. 5A and 5B, the lateral walls 122 of the cavity surround the horizontal angle of view $\alpha$ and the vertical angle of view $\beta$ of the image capturing device 11 by a distance g. Accordingly, while protecting the image capturing device from any background lights or dust inside the housing of the apparatus, these lateral walls 122 do not impinge on the image of the code to be captured. The distance g can be defined so that the lateral walls are positioned just aside the angles of view, for example the gap can be of about 1 mm or greater.

The shape of the cross section of the lateral walls can be a square or a rectangle as illustrated in FIGS. 2 and 3, yet other shapes can be used like ellipse or circular shapes, the lateral walls designing a cone around the view angles.

Figure 6:
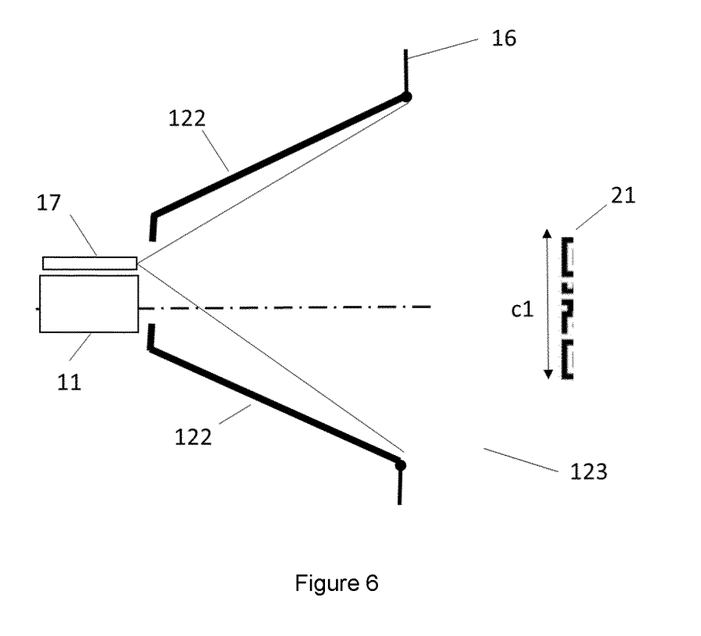

FIG. 6 illustrates schematically an apparatus comprising a light source 17, said light source being positioned at the back side 124 of the cavity and oriented to illuminate the hole 121 at the front side of the cavity and consequently the code 21 when it is positioned in front of the hole.

The apparatus comprises a control system (not illustrated) operable to process the product introduced based on information supplied by the code 21.

Once the image of the code 21 is captured by the camera 11, the captured image is analysed and information related to the product are extracted or deduced by a program code of the control system.

The control system can process the product using information directly encoded on the code and/or indirectly from information encoded on the code, such as a product identification providing access to other information that may be stored as data on a memory unit of the control system of the apparatus or from a remote source through a communication interface of the apparatus.

The system of the present invention presents the advantage of enabling the intuitive positioning of the code in front of the hole of the cavity front side and guarantees straightforward capture of the full area of the code.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification. As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS system 10
apparatus 1
code reader 11
cavity 12
hole 121
lateral walls 122
front side 123
back side 124
plate 125
display 13
vessel 14
camera 15
housing structure 16
light source 17
package 2
code 21

The invention claimed is:

1. A system comprising:
a package containing a product; and
an apparatus using the product, the apparatus being refilled by the product contained in the package,
wherein a code related to the product is associated to the package, the code being a two dimension code and the code presenting a predetermined surface $S_{code}$, and
wherein the apparatus comprises:
a code reader configured to read the code associated to the package, the code reader being an image capturing device, the image capturing device being defined by:
a predetermined focal range,
a horizontal angle of view, and
a vertical angle of view,
a housing structure; and
a cavity inside the housing structure, the cavity extending from a back side in the housing structure to a front side at an external surface of the housing structure, the cavity comprising at least one lateral wall extending between the back side and the front side of the cavity,
wherein the image capturing device is positioned at the back side of the cavity, and an optical axis of the image capturing device extends in a direction of a middle of the front side of the cavity,
wherein the front side of the cavity consists of a hole in the external surface of the housing structure, the hole presenting a surface $S_{hole}$ such that:

$$1.2\ S_{code} \leq S_{hole} \leq 6\ S_{code}$$

wherein a distance extending between the back side of the cavity and the front side of the cavity is comprised in the predetermined focal range of the image capturing device, and
wherein the at least one lateral wall of the cavity is configured to surround the horizontal angle of view and the vertical angle of view of the image capturing device.

2. The system according to claim 1, wherein the hole in the external surface of the housing structure is empty.

3. The system according to claim 1, wherein the cavity comprises a protecting transparent wall at the back side of the cavity.

4. The system according to claim 1, wherein the code is a barcode or a QR code.

5. The system according to claim 1, wherein the image capturing device is a camera.

6. The system according to claim 1, wherein a shape of an outline of the code and a shape of an outline of the hole of the front side of the cavity are similar.

7. The system according to claim 1, wherein the code is a QR code with a square or rectangle outline and the hole of the front side of the cavity presents an outline of a similar square or rectangle shape.

8. The system according to claim 1, wherein the apparatus comprises a light source, the light source being oriented to illuminate the hole from an inside of the cavity.

9. The system according to claim 1, wherein the code provides information related to the product, the information being selected from the group consisting of: an identification of the product, a quantity of product, a nature of the product, an origin of the product, a shelf-life of the product and/or parameters related to a way to process the product inside the apparatus.

10. The system according to claim 1, wherein the apparatus comprises a control system operable to process the product, the control system configured to:
analyse a captured image of the code, obtain information related to the product based on the captured image of the code, and process the product based on the information related to the product.

11. The system according to claim 1, wherein the apparatus is a coffee beans roasting apparatus and the package comprises green or partially pre-roasted coffee beans.

\* \* \* \* \*